(12) United States Patent
Turner et al.

(10) Patent No.: US 11,025,111 B2
(45) Date of Patent: Jun. 1, 2021

(54) ROTOR, ELECTRIC MACHINE AND ASSOCIATED METHOD

(71) Applicant: Regal Beloit Australia Pty Ltd, Rowville (AU)

(72) Inventors: Matthew Turner, Rowville (AU); Greg Heins, Aspendale (AU); Chen Bin, Jiangsu (CN)

(73) Assignee: REGAL BELOIT AUSTRALIA PTY LTD, Rowville (AU)

( * ) Notice: Subject to any disclaimer, the term of this patent is extended or adjusted under 35 U.S.C. 154(b) by 542 days.

(21) Appl. No.: 15/446,233

(22) Filed: Mar. 1, 2017

(65) Prior Publication Data

US 2017/0256999 A1    Sep. 7, 2017

(30) Foreign Application Priority Data

Mar. 1, 2016   (CN) .......................... 201610228434.6

(51) Int. Cl.

| H02K 1/27 | (2006.01) |
|---|---|
| H02K 7/04 | (2006.01) |
| H02K 1/28 | (2006.01) |
| H02K 15/03 | (2006.01) |
| H02K 15/16 | (2006.01) |
| H02K 21/24 | (2006.01) |

(52) U.S. Cl.
CPC ............ *H02K 1/2793* (2013.01); *H02K 1/28* (2013.01); *H02K 7/04* (2013.01); *H02K 15/03* (2013.01); *H02K 15/165* (2013.01); *H02K 21/24* (2013.01); *H02K 2213/03* (2013.01)

(58) Field of Classification Search
CPC ...... H02K 21/24; H02K 1/2793; H02K 1/278; H02K 1/274; H02K 1/22; H02K 1/06; H02K 5/24; H02K 1/28; H02K 15/165; H02K 7/04; H02K 2213/03; H02K 1/2713; H02K 15/03; H02K 15/16
USPC ................... 310/51, 156.32, 156.21; 29/598
See application file for complete search history.

(56) References Cited

U.S. PATENT DOCUMENTS

| 1,947,163 A | 2/1934 | Morrill |
|---|---|---|
| 2,558,737 A * | 7/1951 | Darnell ..................... H02K 7/04 |
| | | 310/51 |

(Continued)

FOREIGN PATENT DOCUMENTS

| EP | 0352214 A2 | 1/1990 |
|---|---|---|
| JP | 2001054267 A | 2/2001 |

OTHER PUBLICATIONS

2nd China Office Action for related Chinese Patent Application 2016102284346 dated Sep. 1, 2020; 15 pp.

(Continued)

*Primary Examiner* — Ahmed Elnakib
(74) *Attorney, Agent, or Firm* — Armstrong Teasdale LLP (57) ABSTRACT

A rotor for connection to a stationary member for use in an electric machine is provided. The rotor includes a body defining a center of rotation of the body. The body further defines a first surface extending in a direction generally perpendicular to the center of rotation. The rotor also includes a magnet connected to the body and an adhesive. The adhesive is positioned between the magnet and the body. The adhesive is adapted to assist in securing the magnet to the body. The first surface of the body is adapted to permit removal of material from the body and to assist in balancing the rotor.

19 Claims, 9 Drawing Sheets

(56) References Cited

U.S. PATENT DOCUMENTS

| | | | | |
|---|---|---|---|---|
| 4,125,792 | A | * | 11/1978 | Schmider ............... H02K 29/08 310/156.34 |
| 4,259,603 | A | * | 3/1981 | Uchiyama ............ H02K 1/2786 310/156.21 |
| 4,633,113 | A | * | 12/1986 | Patel ..................... H02K 15/03 310/156.28 |
| 4,779,165 | A | * | 10/1988 | Elsaesser ............. G11B 17/038 310/156.05 |
| 5,698,915 | A | * | 12/1997 | Fukuyama ........... H02K 1/2786 310/156.26 |
| 6,137,203 | A | | 10/2000 | Jermakian et al. |
| 6,302,650 | B1 | * | 10/2001 | Williams ............ B29C 45/2708 416/144 |
| 6,348,751 | B1 | | 2/2002 | Jermakian et al. |
| 6,362,551 | B1 | * | 3/2002 | Horng ................. F04D 25/0606 310/156.12 |
| 6,580,186 | B1 | * | 6/2003 | Suzuki ................. F16C 17/026 310/51 |
| 7,025,570 | B2 | * | 4/2006 | Jung .................... F04D 29/164 416/144 |
| 8,421,303 | B2 | | 4/2013 | Alvarez et al. |
| 8,598,761 | B2 | | 12/2013 | Langford et al. |
| 8,963,392 | B2 | | 2/2015 | Ziegler et al. |
| 9,065,315 | B1 | | 6/2015 | Ochitani et al. |
| 9,391,500 | B2 | | 7/2016 | Smith et al. |
| 2004/0119374 | A1 | | 6/2004 | Carl et al. |
| 2005/0249596 | A1 | * | 11/2005 | Hsieh .................... F04D 29/662 416/144 |
| 2006/0238056 | A1 | | 10/2006 | Alvarez et al. |
| 2009/0001825 | A1 | * | 1/2009 | Hanaoka ................ H02K 15/03 310/419 |
| 2009/0033160 | A1 | * | 2/2009 | Mueller .................. B60K 6/26 310/58 |
| 2010/0164316 | A1 | | 7/2010 | Langford et al. |
| 2010/0295389 | A1 | | 11/2010 | Tessier |
| 2012/0038235 | A1 | * | 2/2012 | Jang ..................... H02K 1/2786 310/156.12 |
| 2012/0121410 | A1 | * | 5/2012 | Liu ....................... F04D 29/326 415/220 |
| 2013/0069467 | A1 | | 3/2013 | Smith et al. |
| 2013/0270945 | A1 | | 10/2013 | Ziegler et al. |
| 2014/0363296 | A1 | * | 12/2014 | Yeh ...................... F04D 25/064 416/144 |
| 2015/0256047 | A1 | * | 9/2015 | Major ...................... H02K 7/04 310/51 |
| 2016/0072362 | A1 | | 3/2016 | Kube |
| 2017/0117763 | A1 | | 4/2017 | Woolmer et al. |

OTHER PUBLICATIONS

India Examination Report for Application No. 201714005921 dated Aug. 20, 2020; 7 pp.

* cited by examiner

ROTOR, ELECTRIC MACHINE AND ASSOCIATED METHOD

CROSS REFERENCE TO RELATED APPLICATIONS

The present application is a continuation application of China Patent Application No. 201610228434.6, filed Mar. 1, 2016 and Applicatant hereby make the claim for priority as required by 35 U.S.C. 119(b) and 37 CFR 1.55(d). The entire disclosure of China Patent Application No. 201610228434.6 is hereby expressly incorporated herein by reference.

BACKGROUND OF THE INVENTION

The embodiments described herein relate generally to a rotor for use in an electric machine, and more specifically, to an apparatus and method associated with a rotor for use in an axial flux electric motor.

The common configuration for an electric motor is radial-flux, which is composed from two cylinders, a cylindrical stator and a cylindrical rotor (having an axial shaft), with a cylindrical air gap in between and in which the flux travels across the air gap in a direction that is radial to the shaft on the rotor. In order to hold the two cylinders concentric and thus keep the air gap constant thickness in a radial flux motor, it is necessary to support the shaft at each end of the motor.

Given that many applications which are mechanically powered by a radial-flux electric motor do not intrinsically require a shaft, it is desirable to eliminate the necessity for a shaft and thus provide a cheaper and simpler structure. An axial flux motor is one such structure.

Further, many applications which are mechanically powered by a radial-flux electric motor provide for ample landscape for a large diameter motor but little room along the longitudinal axis of the shaft. An axial flux motor is well suited to such applications as the axial flux motor with high motor power capacity may indeed have a very short axial shaft length.

Typically, an axial flux motor includes a rotor having one or more permanent magnets mounted to a surface of the rotor and a stator having a stator winding connected to a power source. The motor also includes a bearing positioned between the rotor and the stator for rotationally supporting movement of the rotor relative to the stator. The bearing provides an air gap between the rotor and the stator. The permanent magnets can be replaced by a magnet field induced by an electrical winding.

As with all products, it is important to provide the customer with a high value product. For axial flux motors high value includes low cost and high quality. High quality relates to superior performance. Performance is measure by reliability and low noise and vibration. Low noise is related closely to low vibration. Low vibration is related to the accuracy or precision of the motor components, particularly the rotating components (the rotor assembly) and their assembly into a motor. Greater accuracy and precision of the rotor assembly typically results in reduced vibration. Balancing of the rotor assembly may further reduce the vibration. The greater accuracy and precision may necessitate more expensive manufacturing processes including, for example, precision machining, as well as, very expensive precision balancing of the rotor assembly. Providing a motor that has both low vibration and low cost provides a challenge. The present invention is directed to alleviate at least some of these problems with the prior art.

BRIEF DESCRIPTION OF THE INVENTION

According to an embodiment of the present invention, a rotor for connection to a stationary member for use in an electric machine is provided. The rotor includes a body defining a center of rotation of the body. The body further defines a first surface extending in a direction generally perpendicular to the center of rotation. The rotor also includes a magnet connected to the body and an adhesive. The adhesive is positioned between the magnet and the body. The adhesive is adapted to assist in securing the magnet to the body. The first surface of the body is adapted to permit removal of material from the body and to assist in balancing the rotor.

According to an aspect of the present invention, the rotor may be provided such that the body is adapted to define a cavity for receiving at least a portion of the adhesive.

According to another aspect of the present invention, the rotor may be provided such that the body defines a magnet mounting surface and an internal diameter. The magnet is positioned adjacent the magnet mounting surface and the internal diameter. Further, the cavity includes a circumferential groove positioned between the magnet mounting surface and the internal diameter.

According to another aspect of the present invention, the rotor may be provided such that the body is fabricated from a sheet of metal having a uniform thickness.

According to another aspect of the present invention, the rotor may be provided such that the rotor further defines a second surface extending in a direction generally parallel and spaced from the first surface. The second surface is opposed to the first surface. The second surface of the body is adapted to permit removal of material therefrom to assist in balancing of the rotor.

According to another aspect of the present invention, the rotor may be provided such that the body defines a central hub defining a central bore through the body.

According to another aspect of the present invention, the rotor may be provided such that the removal of material from the first surface and the second surface of the body is removed from a sector of the first surface and a sector the second surface of the body to assist in balancing of the rotor.

According to another aspect of the present invention, the rotor may be provided such that the sector of the first surface of the body and the sector the second surface of the body are in juxtaposition with each other.

According to another aspect of the present invention, the rotor may be provided such that the second surface of the body is positioned radially outward from the magnet.

According to another embodiment of the present invention, an electric motor is provided. The motor includes a housing a stator and a rotor. The stator is fixedly secured to the housing. The rotor is rotatably secured to housing. The rotor includes a rotor for connection to a stationary member for use in an electric machine. The rotor includes a body defining a center of rotation of the body. The body further defines a first surface extending in a direction generally perpendicular to the center of rotation. The rotor also includes a magnet connected to the body and an adhesive. The adhesive is positioned between the magnet and the body. The adhesive is adapted to assist in securing the magnet to the body. The first surface of the body is adapted to permit removal of material from the body and to assist in balancing the rotor.

According to another aspect of the present invention, the electric motor may be provided such that the body is adapted to define a cavity for receiving at least a portion of the adhesive.

According to another aspect of the present invention, the electric motor may be provided such that the body defines a magnet mounting surface and an internal diameter. The magnet is positioned adjacent the magnet mounting surface and the internal diameter. The electric motor may be further provided such that the cavity includes a circumferential groove positioned between the magnet mounting surface and the internal diameter.

According to another aspect of the present invention, the electric motor may be provided such that the body is fabricated from a sheet of metal having a uniform thickness.

According to another aspect of the present invention, the electric motor may be provided such that the rotor further defines a second surface extending in a direction generally parallel and spaced from the first surface. The second surface is opposed to the first surface. The second surface of the body is adapted to permit removal of material therefrom to assist in balancing of the rotor.

According to another aspect of the present invention, the electric motor may be provided such that at least one surface of the body is machined.

According to another aspect of the present invention, the electric motor may be provided such that the body defines a central hub defining a central bore through the body.

According to another aspect of the present invention, the electric motor may be provided such that the removal of material from the first surface and the second surface of the body is removed from a sector of the first surface and a sector the second surface of the body to assist in balancing of the rotor.

According to another aspect of the present invention, the electric motor may be provided such that the sector of the first surface of the body and the sector the second surface of the body are in juxtaposition with each other.

According to another aspect of the present invention, the electric motor may be provided such that the second surface of the body is positioned radially outward from the magnet.

According to another embodiment of the present invention, a method for making a rotor for an axial flux electric motor is provided. The method includes the step of fabricating a rotor. The rotor includes a body defining a center of rotation of the body. The body further defines a first surface extending in a direction generally perpendicular to the center of rotation and further defines a second surface extending in a direction generally parallel and spaced from the first surface. The method further includes the steps of applying an adhesive to a magnet connecting surface of the body, performing a balance test on the rotor, removing material from the first surface of the body, and removing material from the second surface of the body.

According to another embodiment of the present invention, the method for making a rotor may be provided such that the step of removing material from the first surface of the body includes removing material from a sector of the first surface and such that the step of removing material from the second surface of the body includes removing material from a sector of the second surface.

DETAILED DESCRIPTION OF THE INVENTION

Due to increased customer and industry demands, reduced noise and vibration, lower costs, and improved performance in capacity and efficiency are desirable in the design and manufacture of devices powered by electric motors. The methods, systems, and apparatus described herein facilitate improved rigidity and strength, reduced noise and vibration, lower costs, and improved performance in capacity and efficiency for an electric machine. This disclosure provides designs and methods to improve rigidity and strength, reduce noise and vibration, lower costs, and improved performance in capacity and efficiency. This disclosure further provides designs and methods to reduce reduced noise and vibration, lower costs, and improved performance in capacity and efficiency.

Technical effects of the methods, systems, and apparatus described herein include at least one of improved performance and quality and reduced labor costs.

Figure 1:
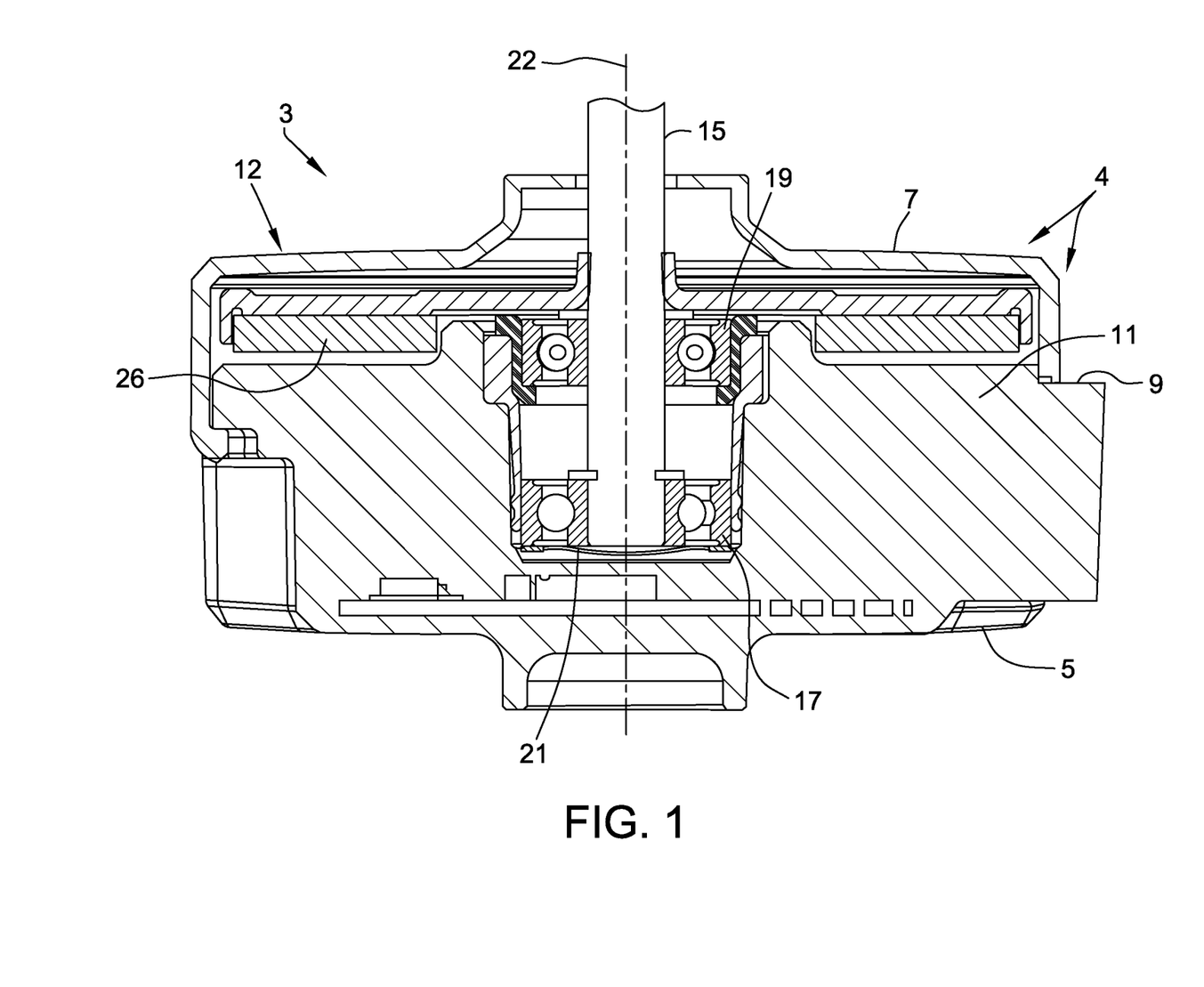
FIG. 1 is a cross sectional view of an axial flux motor using a rotor according to the present invention.
Figure 2:
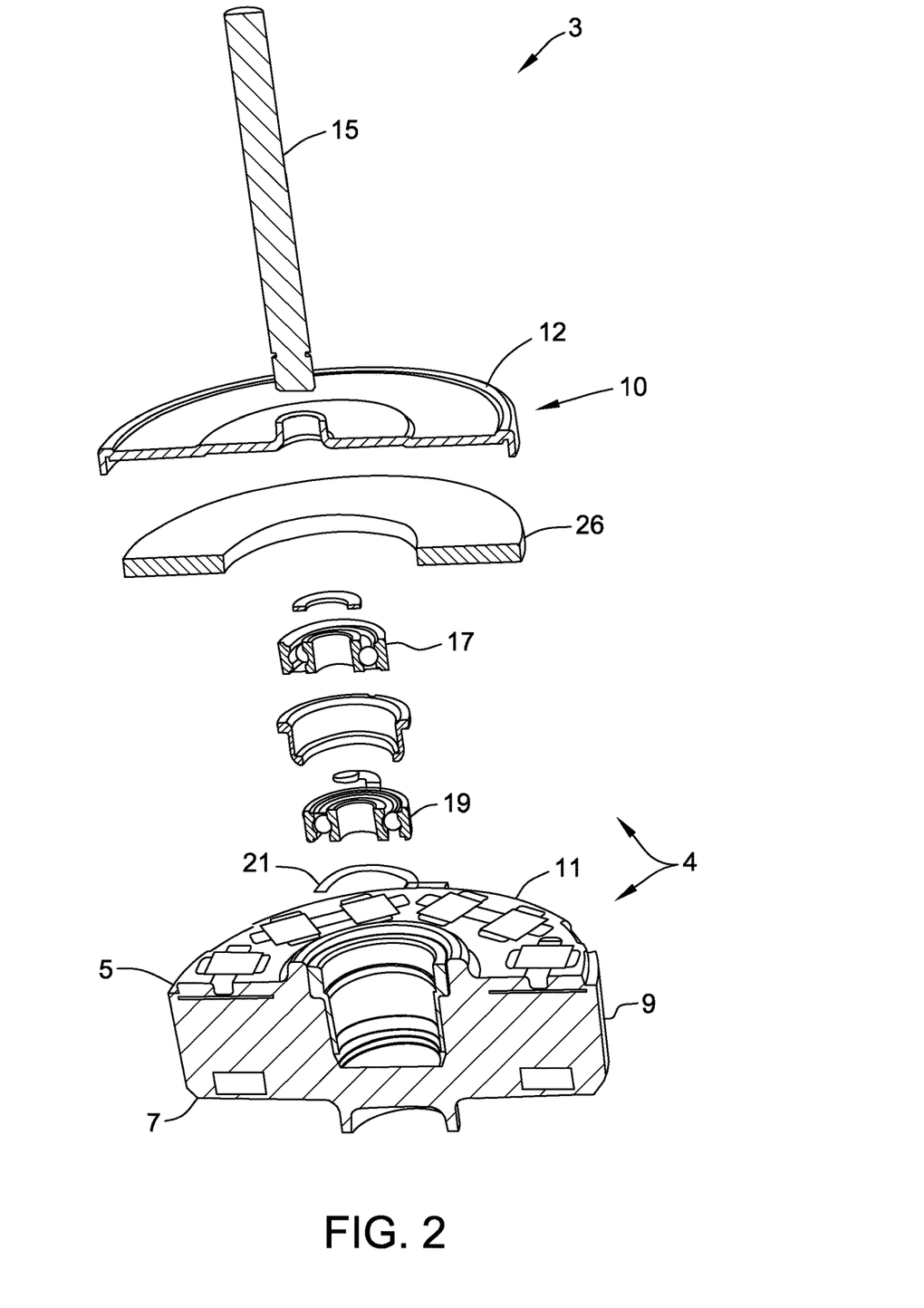
FIG. 2 is exploded perspective view of the rotor of FIG. 1.

FIGS. 1-2 of the drawings show an axial flux motor 3 which is exemplary of a motor using the rotor of the present invention. The components of the motor can be best seen in the exploded view shown in FIG. 2. These components include a housing 4, incorporating end shields 5 and 7 and a side wall 9, a stator 11 (although the windings are not shown in the drawings) mounted within the housing. A rotor disc or rotor 12 is mounted on a shaft 15 which is rotatable within the housing by means of bearings 17 and 19. A wave washer 21 is also included between the bearing 17 and the end shield 5 so as to reduce noise produced by the bearing and promote quieter operation of the motor 3.

As can be seen in the cross sectional side view shown in FIG. 1, the rotor disc 12 includes magnet 26 which may be in the form of a plurality of permanent magnets, which are preferably neodymium magnets. For example, the magnets may be made of Neodymium Iron Boron (NdFeB) material; however, alternative materials such as Samarium Cobalt or Ferrite will also suffice. As shown, the magnet 26 is a unity magnet that has a disk or cylindrical shape.

Figure 3:
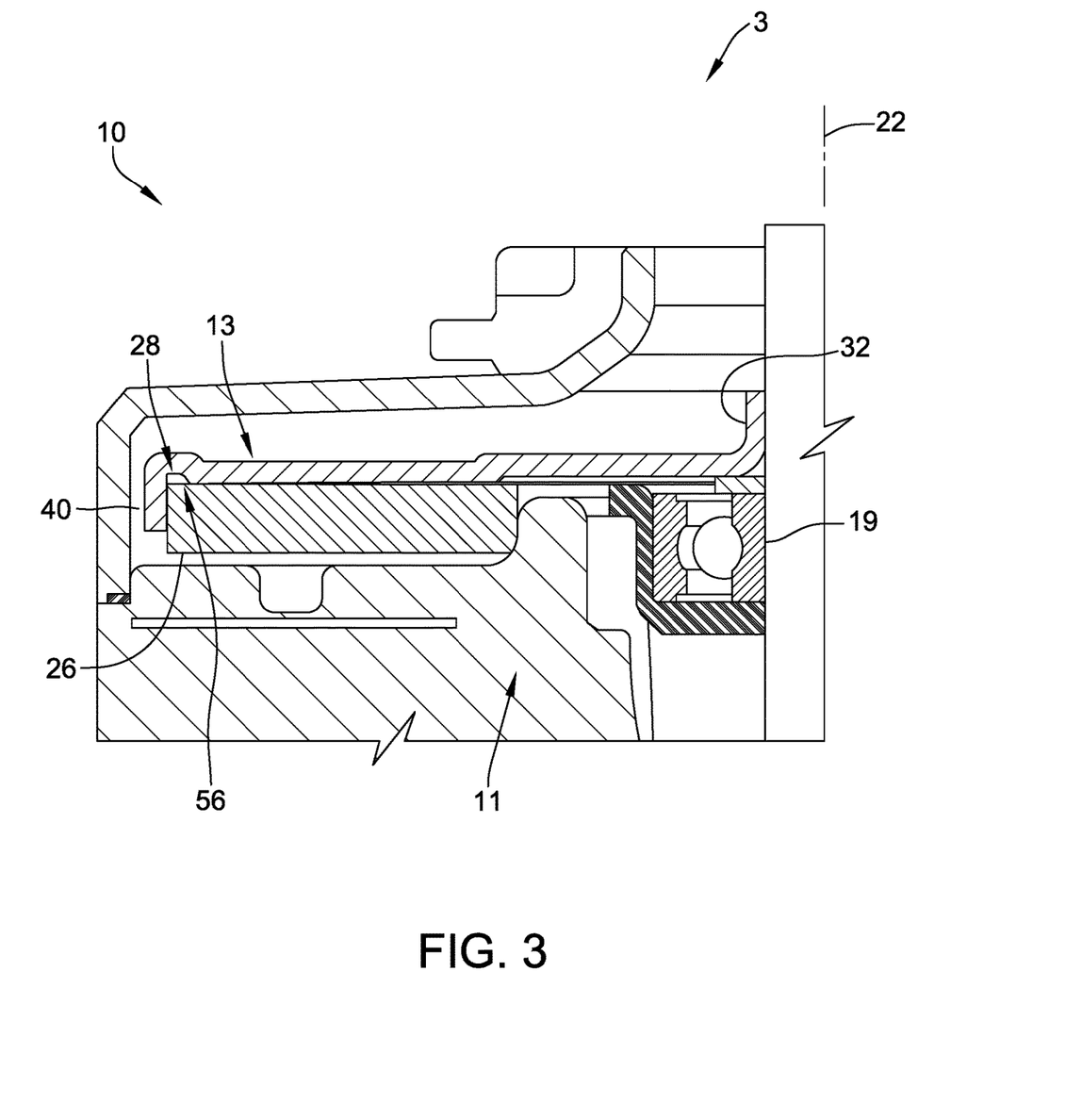
FIG. 3 is a partial cross sectional view of the rotor of FIG. 2.
Figure 4:
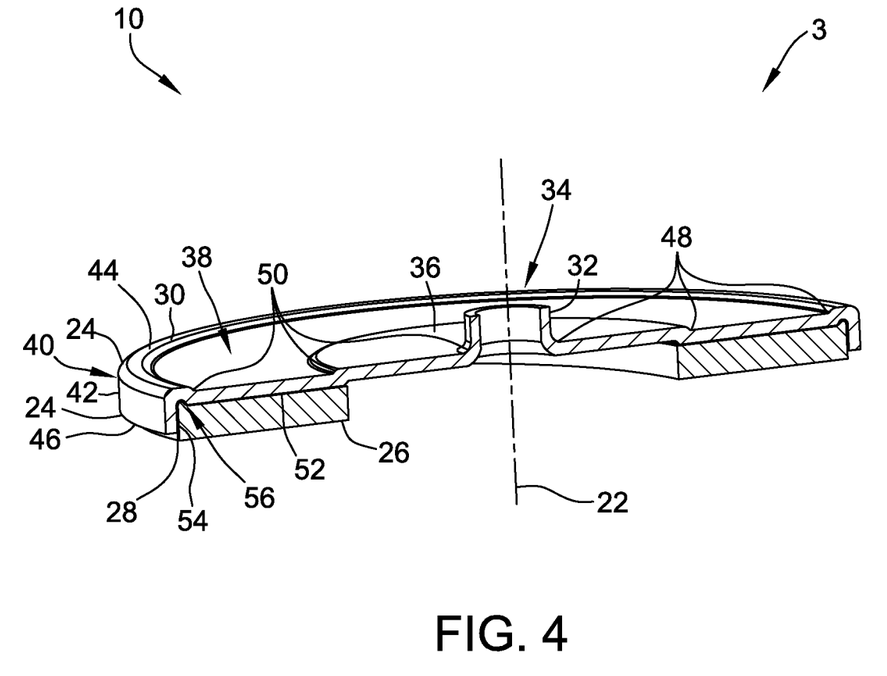
FIG. 4 is a perspective view, partially in cross section, of the rotor of FIG. 2.

According to an embodiment of the present invention and referring now to FIGS. 3-4, rotor assembly 10 for connection to stationary member 11, for example a stator, is provided. The rotor assembly 10 is adapted to be used in electric machine 3, for example a motor or generator. The rotor assembly 10 includes body 13, in the form of, for example, a disc shaped member. The rotor assembly 10 defines a center of rotation 22 of the body 13.

The body 13 further defines a balancing surface 24 extending in a direction generally perpendicular to the center of rotation 22. The rotor assembly 10 also includes magnet 26 connected to the body 13 and an adhesive 28. The adhesive 28 is positioned between the magnet 26 and the body 13. The adhesive 28 is adapted to assist in securing the magnet 26 to the body 13. The balancing surface 24 of the body 13 is adapted to permit removal of material 30 from the body 13 and to assist in balancing the rotor assembly 10.

The body 13 may have any suitable shape capable of supporting the magnet 26 and for receiving the adhesive 28.

As shown, the body 13 is generally cylindrical and includes a central portion in the form of a central hub 32. As shown, the central hub 32 defines a cylindrical central bore 34. The central bore 34 defines the center of rotation 22 of the body 13.

As shown, the body 13 further includes a disk shaped intermediate portion 36 extending outwardly from the central hub 32 and a disk shaped outer portion 38 extending outwardly from the intermediate portion 36.

As shown, a rim 40 extends outwardly from the disk shaped outer portion 38. The magnet 26, as shown, is positioned between the rim 40 and the disk shaped outer portion 38.

The rim 40, as shown, has a generally ring shape defining a cylindrical outer periphery 42, a hub side surface 44 and an opposed magnet side surface 46. As shown in FIGS. 3-4, the hub side surface 44 of the rim 40 may extend radially outwardly from the disk shaped outer portion 38 of the body 13.

As shown, transitions 48 between the hub 32 and the intermediate portion 36, between the disk shaped intermediate portion 36 and the disk shaped outer portion, and between the disk shaped outer portion and the rim may include transition features 50 in the form of, for example, chamfers or radii to reduce stress risers in the body 13.

It should be appreciated that the shape of the body 13, as shown in FIGS. 3-4 and as described above, is only typical and any suitable shape may be used. Since the body rotates during operation, a shape symmetrical about center of rotation 22 is preferred to limit forces on the bearings 17 and 19 during rotation.

For example, the body 13 may be made of a metal, a powdered metal, a polymer or a composite material. For example, the body 13 may be molded, die cast, sintered from powdered metal, stamped or machined. To provide a durable component at a low cost, the body 13 may be stamped from sheet metal or made from sintered powdered metal. In a preferred embodiment the body 13 is stamped from sheet of metal having a uniform thickness.

The magnet 26 may be positioned on and secured to any suitable portion of the body 13. Preferably, the magnet 26 is positioned such that its magnetic field may interact with the stator 11. For example, and as shown in FIGS. 3-4, the magnet 26 may be positioned against bearing side surface 52 of the disc shaped outer portion 38 of the body 13 and against inner surface 54 of the rim 40.

The magnet 26 may be a unitary component, as shown, or may include a plurality of segments, either adjoining or spaced-apart.

The magnet 26 may be secured to the body 13 in any suitable manner. For example, the magnets 26 may be secured, with fasteners, with an interference fit, or, as shown, by an adhesive 28.

The adhesive 28 may be positioned on bearing side surface 52, on inner surface 54, or both. To provide a location for adhesive and to assure a secure attachment of the magnet 26, the body 13 may, as shown, include a cavity 56 for receiving at least a portion of the adhesive 28.

The adhesive 28 may be applied to the cavity 56 and then the magnet 26 may be pressed onto the body 13. The ability of the cavity 56 to receive the sufficient adhesive 28 assures that the magnet 26 evenly and properly seats against the bearing side surface 52 of the disc shaped outer portion 38.

The design of the rotor 12 assures that adhesive 28 reaches the entire body contact surface of the magnet 26. The inherently accurate and complete seating of the magnet 26 against the rotor body 13 improves the balancing of rotor assembly and secure attachment of the magnet 26.

As shown in FIGS. 3-4, the cavity 56 is in the form of a circumferential groove. The groove 56, as shown, is positioned between the bearing side surface 52 of the disc shaped outer portion 38 of the body 13 and the inner surface 54 of the rim 40.

Since the rotor assembly 10 rotates in normal operation at a high rate of speed, minimizing the vibration of the rotor assembly 10 is preferred. Balancing of the rotor assembly 10 as a step in the manufacturing process of the motor 3 has been found to assist in minimizing the vibration of the rotor assembly 10. While static balancing of the rotor assembly may reduce vibration of the assembly 10, dynamic balancing is preferred.

The balancing equipment used may be any equipment that can be relied upon to improve the balance of the rotor assembly 10 and to reduce vibration and noise of the motor 3.

When balancing the rotor assembly 10, material 30 is typically added or removed from the rotor assembly 10 a particular location or locations, as determined by the balancing equipment used. As shown and to minimize cost and complexity, material 30 is removed from the rotor assembly to balance the assembly 10. For simplicity and as shown, material is removed from the periphery (typically the rim 40 of the body 13). While material may be removed from the magnet 26, doing so may be more difficult and may affect the performance of the magnet 26.

While material may be removed from any surface of the body 13, removal from an external surface of the body 13 is preferred. For example, and as shown in FIGS. 3-7, material 30 may be removed from hub side surface 44 of rim 40 and from magnet side surface 46 of rim 40. Optimizing the balance of the rotor assembly may be provided by removing material 30 from both hub side surface 44 and from magnet side surface 46. The material 30 removed from hub side surface 44 may be similar and may match or correspond to the material 30 removed from magnet side surface 46. The material removed from faces 44 and 46 may be adjusted by the depth or axial dimension of material removed and may be adjusted by varying the amount, portion or degrees of the periphery of the body 13 that has material removed.

Material 30 may be removed using any suitable tool powered by any suitable power source. For example, the material 30 may be removed by grinding, washing, turning, milling, planning, laser, torching, drilling, melting (by torch or laser, etc.). If the material is hard or if a very precise removal of material is desired, removal of the material 30 by grinding may be preferred.

Figure 5:
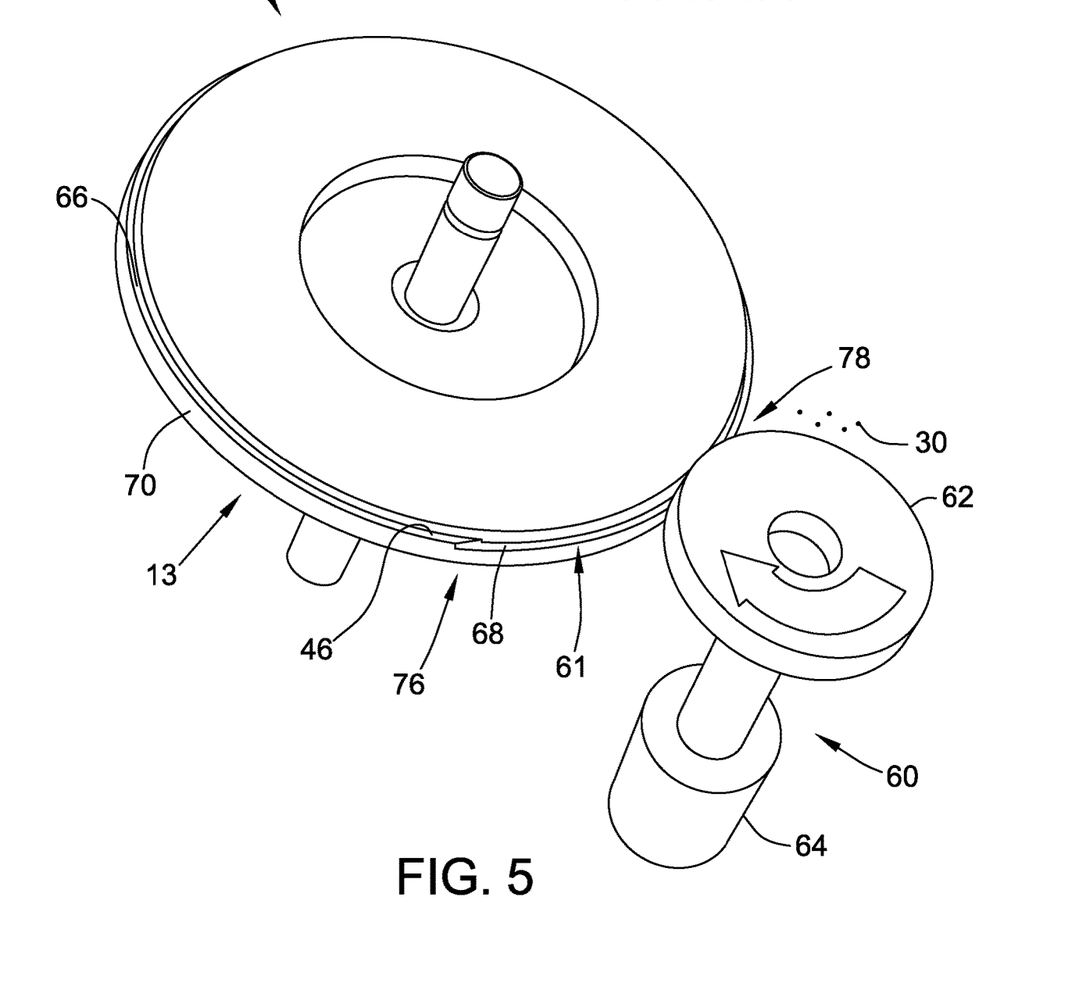
FIG. 5 is a perspective view of the rotor of FIG. 2, showing a grinding wheel engaging the magnet side of the rotor of FIG. 2 for removing material from the rotor to assist in balancing the rotor.

For example, and referring to FIG. 5, a magnet side material removal tool assembly 60 is shown for removing material 30 from the magnet side surface 46 of body 13 of rotor assembly 10 to define magnet side void 61 of body 13. The magnet side material removal tool assembly 60 includes a magnet side material removal tool 62 which is powered by magnet side material removal power source 64. As shown the power source 64 may be a grinder and the tool 62 may be a grinding wheel. It should be appreciated that the power source and the tool may be any combination to remove material as described above. The grinder 64 may be hand held, connected to a robot or connected to a machine.

Figure 5A:
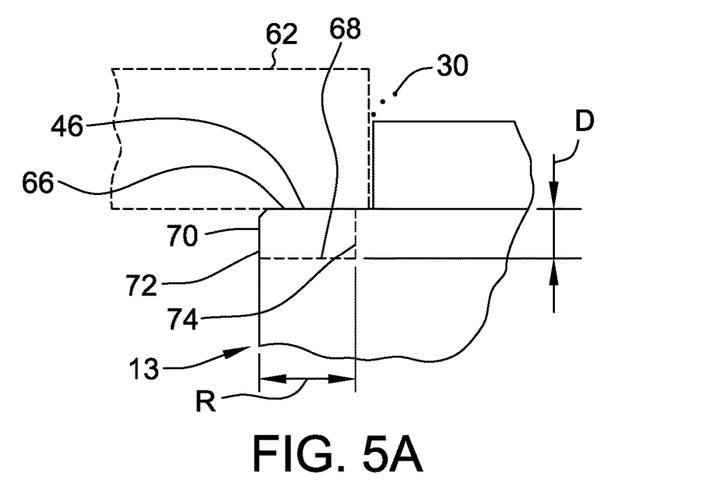
FIG. 5A is a partial cross sectional view of FIG. 5 showing the material removal area in greater detail.

Referring now to FIG. 5A, the wheel 62 may remove material 30 from magnet side surface 46 an axial distance D from the initial surface 66 to the ground surface 68. Further, the wheel 64 may remove material 30 from outer peripheral surface 70 of body 13 a radial distance R from the initial outer peripheral surface 72 to the ground outer peripheral surface 74.

Referring again to FIG. 5, the wheel 64 may further remove material 30 from outer peripheral surface 70 of body 13 an included angle $\theta$ from the entering position 76 to the exiting position 78.

Figure 6:
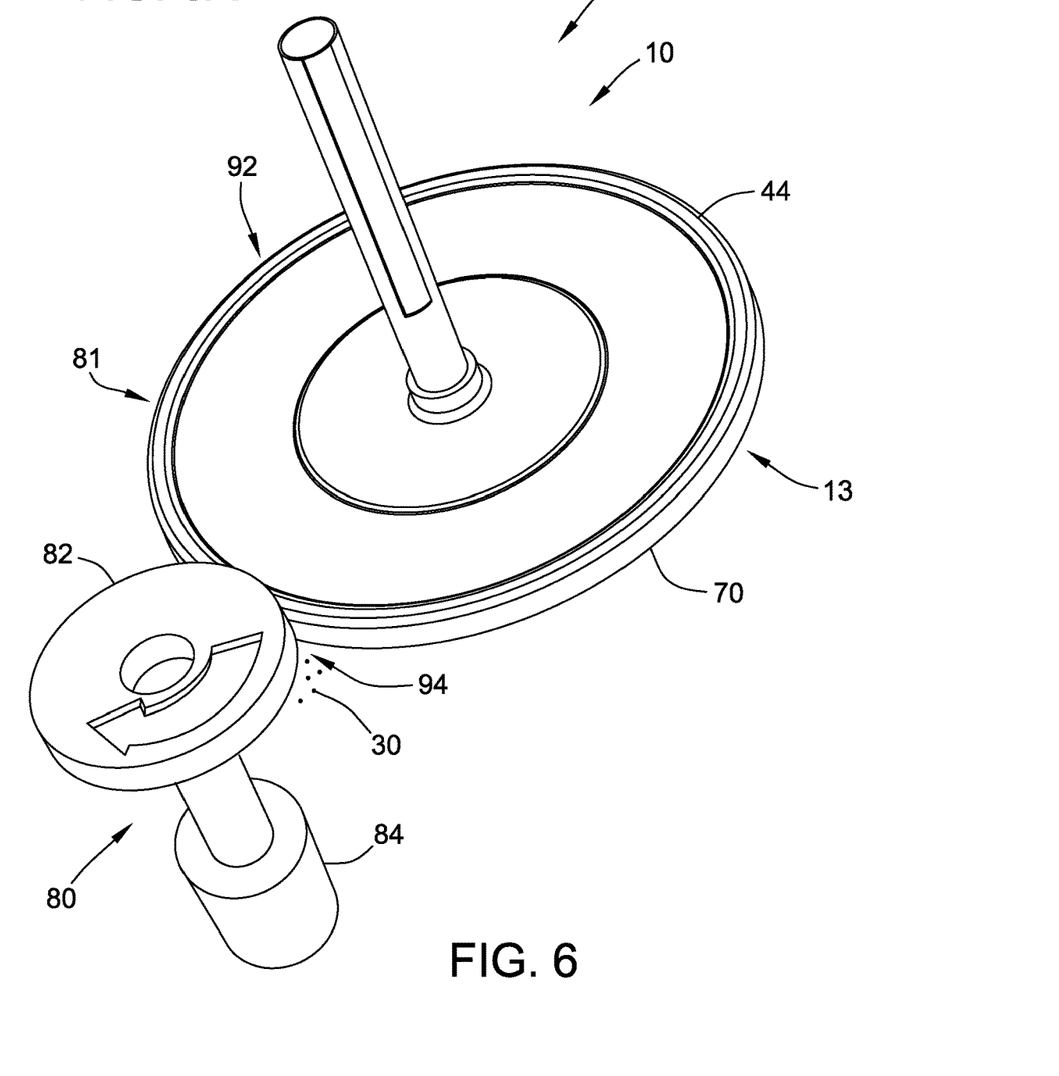
FIG. 6 is a perspective view of the rotor of FIG. 2, showing a grinding wheel engaging the hub side of the rotor of FIG. 2 for removing material from the rotor to assist in balancing the rotor.

While removal from the magnet side surface 46 of body 13 of rotor assembly 10 may be sufficient for proper balancing, for improved balancing of the rotor assembly 10 and as shown in FIG. 6, material 30 may also or alternatively be removed from the hub side surface 44 of body 13 of rotor assembly 10.

A hub side material removal tool assembly 80 is shown for removing material 30 from the hub side surface 44 of body 13 of rotor assembly 10 to define hub side void 81 of body 13. The hub side material removal tool assembly 80 includes a hub side material removal tool 82 which is powered by a hub side material removal power source 84. As shown, the power source 84 may be a grinder and the tool 82 may be a grinding wheel.

It should be appreciated that the power source 64, 84 and the tool 62, 82 may be any combination to remove material as described above. The tool 62, 82 may be hand held, connected to a robot or connected to a machine. It should be appreciated that the tool assembly 60 and the tool assembly 80 may be identical or different. It should be appreciated that the tool 62 and the tool 82 may be identical or different. It should be appreciated that the power source 64 and the power source 84 may be identical or different.

Figure 6A:
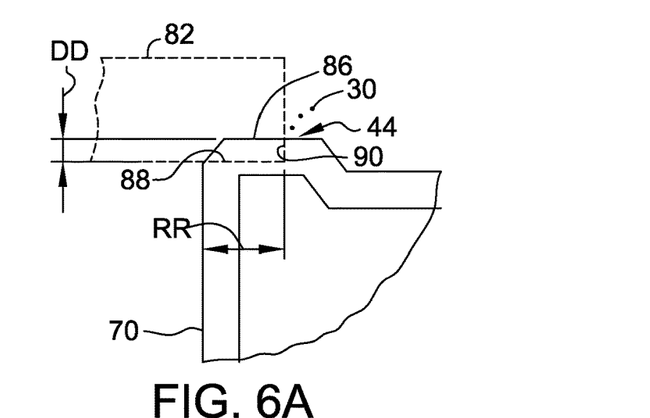
FIG. 6A is a partial cross sectional view of FIG. 6 showing the material removal area in greater detail.

Referring now to FIG. 6A, the wheel 82 may remove material 30 from hub side surface 44 an axial distance DD from initial surface 86 to the ground surface 88. Further, the wheel 82 may remove material 30 from outer peripheral surface 70 of body 13 a radial distance RR from the initial outer peripheral surface 72 to the ground outer peripheral surface 90.

Referring again to FIG. 6, the wheel 64 may further remove material 30 from outer peripheral surface 70 of body 13 an included angle $\theta\theta$ from the entering position 92 to the exiting position 94.

It should be appreciated that the distances D, R and $\theta$ of body 13 of magnet side void 61 may be identical with or different from the dimensions DD, RR and $\theta\theta$ of hub side void 81 of body 13. Having the dimensions D, R and $\theta$ and the distances DD, RR and $\theta\theta$ similar or identical may result in improved balancing.

Figure 7:
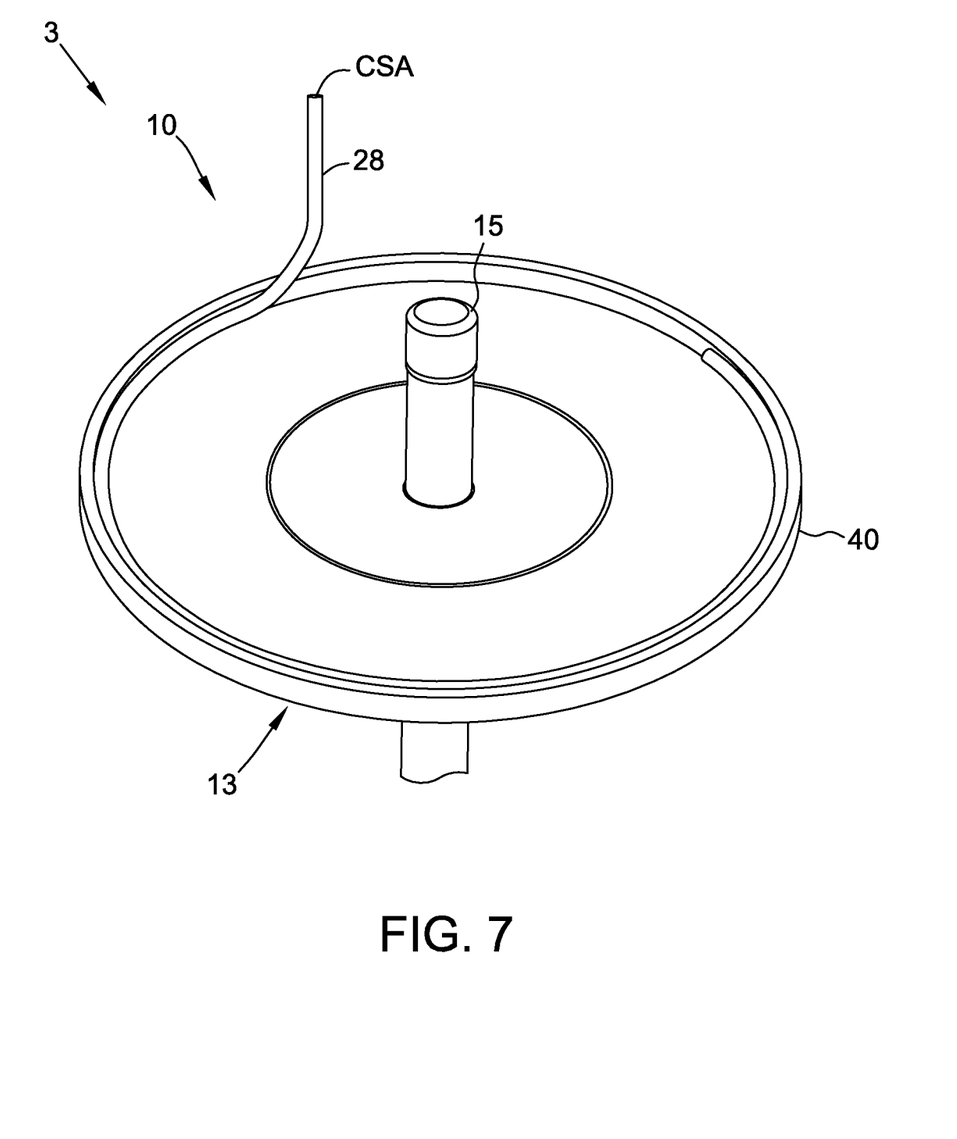
FIG. 7 is a perspective view of the rotor of FIG. 2 showing the application of adhesive into a groove formed on the rotor.
Figure 8:
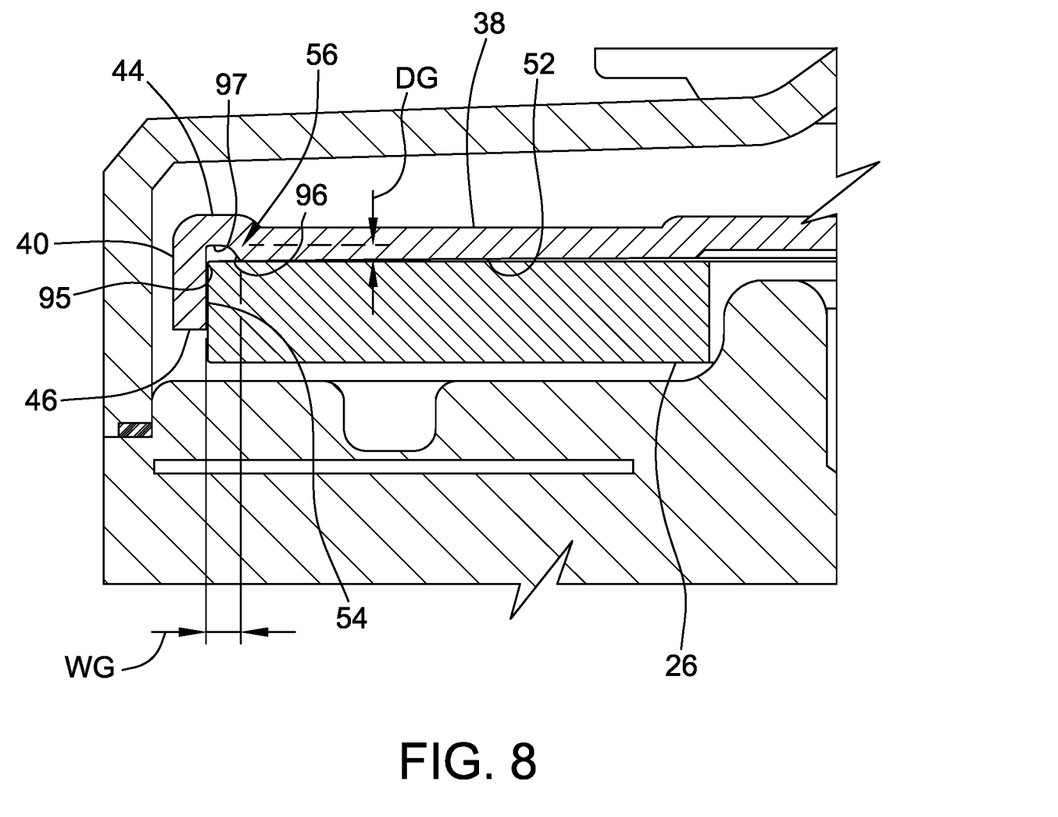
FIG. 8 is a perspective view, partially in cross section, of the rotor of FIG. 2.

Referring now to FIG. 7 and FIG. 8, the application of the adhesive 28 in the groove 56 of the body 13 is shown in greater detail. As shown in FIG. 7, adhesive 28 is placed in the groove 56 along the entire groove 56.

Referring to FIG. 8, before the adhesive 28 has set or hardened, the magnet 26 is positioned against bearing side surface 52 of the of the disc shaped outer portion 38 and against inner surface 54 of rim 40. Adhesive 28 should uniformly secure magnet 26.

The groove 56 may have any suitable shape and may, as shown, for simplicity have a uniform cross section. The groove 56 may, as shown, for simplicity have an outer surface 95 extending from inner surface 54 of rim 40 and a tapered inner surface 96 extending from bearing side surface 52 of the disc shaped outer portion 38. The groove 56 may, as shown, for simplicity also have bottom surface 97 spaced from and parallel to hub side surface 44 of rim 40. The groove 56 may have a width WG and a depth DG. The width WG and depth DG as well as the cross sectional area of the adhesive CSA are selected to provide for sufficient adhesive to secure the magnet 26.

Figure 9:
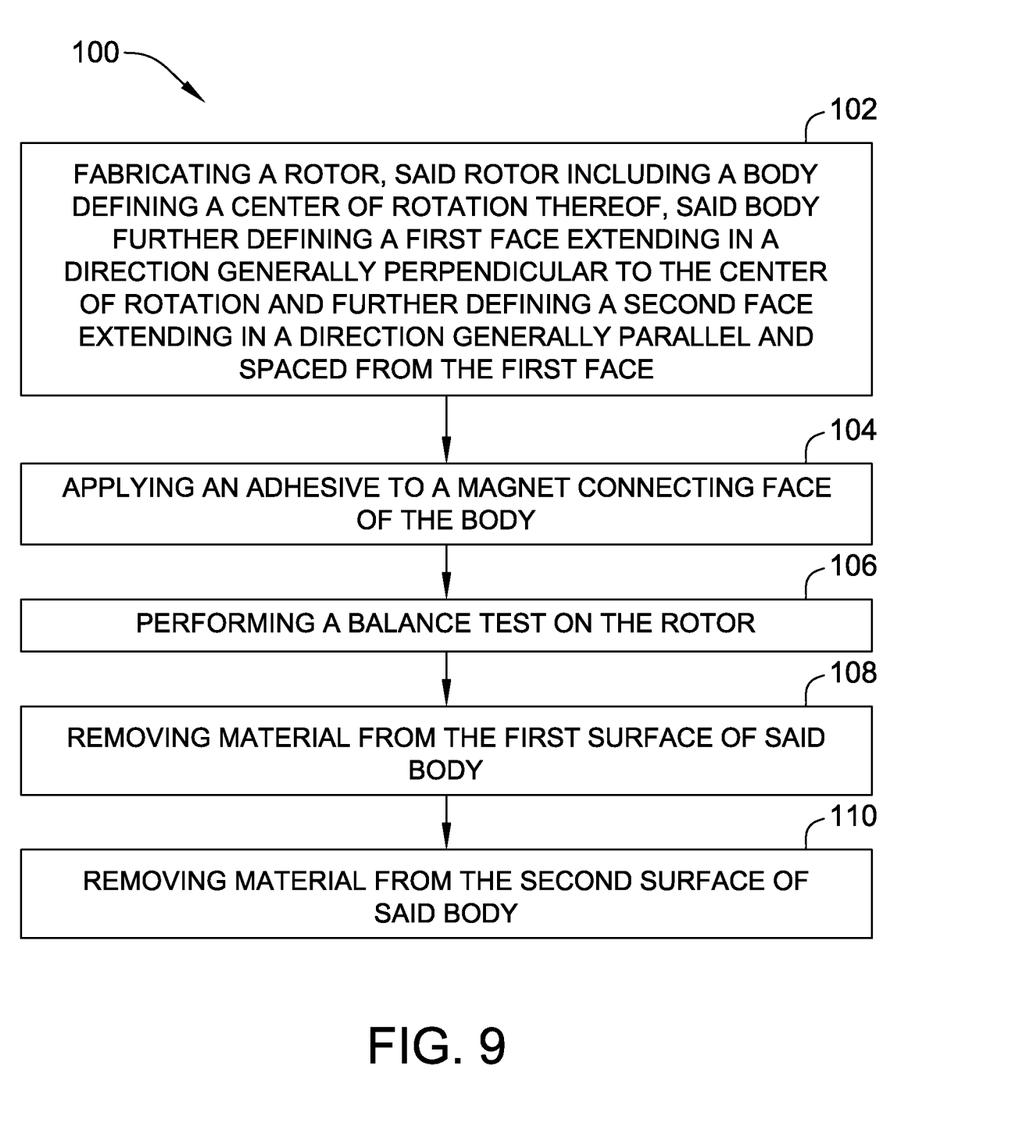
FIG. 9 is a flow chart of an exemplary method for providing a rotor according to the present invention.

Referring now to FIG. 9 and according to another embodiment of the present invention, a method 100 for making a rotor for an axial flux electric motor is provided. The method 100 includes step 102 of fabricating a rotor. The rotor includes a body defining a center of rotation of the body. The body further defines a first surface extending in a direction generally perpendicular to the center of rotation and further defines a second surface extending in a direction generally parallel and spaced from the first surface. The method further includes step 104 of applying an adhesive to a magnet connecting surface of the body, step 106 of performing a balance test on the rotor, step 108 of removing material from the first surface of the body, and step 110 of removing material from the second surface of the body.

The step 110 of removing material from the first surface of the body may include removing material from a sector of the first surface and such that the step 112 of removing material from the second surface of the body includes removing material from a sector of the second surface.

The methods, systems, and apparatus described herein provide improved rigidity and durability of an electric motor. Exemplary embodiments of methods, systems, and apparatus are described and/or illustrated herein in detail. The methods, systems, and apparatus are not limited to the specific embodiments described herein, but rather, components of each apparatus and system, as well as steps of each method, may be utilized independently and separately from other components and steps described herein. Each component, and each method step, can also be used in combination with other components and/or method steps.

When introducing elements/components/etc. of the methods and apparatus described and/or illustrated herein, the articles "a", "an", "the", and "the" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Described herein are exemplary methods, systems and apparatus utilizing designs that improves balancing of a rotor of an electric machine to eliminates excessive noise and vibration. Furthermore, the exemplary methods system and apparatus reduced noise while reducing or eliminating an increase in manufacturing cost of the motor. The methods, system and apparatus described herein may be used in any suitable application. However, they are particularly suited for HVAC and pump applications.

Exemplary embodiments of the rotor and motor are described above in detail. The electric motor and its components are not limited to the specific embodiments described herein, but rather, components of the systems may be utilized independently and separately from other components described herein. For example, the components may also be used in combination with other motor systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A rotor for connection to a stationary member for use in an electric machine, comprising:
    a body defining a center of rotation thereof and comprising:
        an intermediate portion;
        an outer portion circumscribing said intermediate portion, wherein a transition feature is defined between said intermediate portion and said outer portion, said body further defining a first surface extending in a direction generally perpendicular to the center of rotation; and
        a ridge circumscribing said outer portion, wherein said ridge comprises a ridge surface parallel to and axially spaced from said first surface;
    a magnet connected to the said body opposite said first surface; and
    an adhesive, said adhesive positioned between said magnet and said body and adapted to assist in securing said magnet to said body, the first surface of said body adapted to permit removal of material therefrom to assist in balancing of said rotor, wherein the material is unitarily formed with said body.

2. The rotor of claim 1, wherein said body comprises:
    a rim extending axially from an outer periphery of said ridge, wherein said ridge is adapted to define a cavity at a junction of said outer portion and said rim for receiving at least a portion of said adhesive.

3. The rotor of claim 2:
    wherein said outer portion defines a magnet mounting surface and wherein said rim defines an inner rim surface, said magnet positioned adjacent the magnet mounting surface and the inner rim surface; and
    wherein said cavity includes a circumferential groove positioned between the magnet mounting surface and the inner rim surface.

4. The rotor of claim 1, wherein said body is fabricated from a sheet of metal having a uniform thickness.

5. The rotor of claim 1, wherein said rim defines a second surface extending in a direction generally parallel and spaced from the first surface, the second surface opposed to said first surface, the second surface of said body adapted to permit removal of material therefrom to assist in balancing of said rotor.

6. The rotor of claim 5:
    wherein the removal of material from the first surface of said body is removed from a sector of the first surface;
    wherein the removal of material from the second surface of said body is removed from a sector of the second surface; and
    wherein the sector of the first surface of said body and the sector the second surface of said body are in juxtaposition with each other.

7. The rotor of claim 5, wherein the second surface of said body is positioned radially outward from said magnet.

8. The rotor of claim 1, wherein said body defines a central hub defining a central bore therethrough.

9. The rotor of claim 1, wherein the removal of material from the first surface of said body is removed from a sector of the first surface.

10. An electric motor comprising;
    a housing;
    a stator fixedly secured to said housing; and
    a rotor, said rotor rotatably secured to housing, said rotor including a body defining a center of rotation thereof, said body comprising:
        an intermediate portion;
        an outer portion circumscribing said intermediate portion, wherein at least one transition feature is defined between said intermediate portion and said outer portion;
        a ridge circumscribing said outer portion, wherein said ridge comprises a first surface extending in a direction generally perpendicular to the center of rotation, wherein said first surface is parallel to and axially spaced from a hub-side surface of said outer portion; and
        a second surface extending in a direction generally parallel and axially spaced from the first surface;
    a magnet connected to the said body; and
    an adhesive, said adhesive positioned between said magnet and said body and adapted to assist in securing said magnet to said body, the first surface and the second surface of said body adapted to permit removal of material therefrom to assist in balancing of said rotor, wherein the material is unitarily formed with said body.

11. The electric motor of claim 10, wherein said ridge is adapted to define a cavity for receiving at least a portion of said adhesive.

12. The electric motor of claim 11:
wherein said body defines a magnet mounting surface and an internal diameter, said magnet positioned adjacent the magnet mounting surface and the internal diameter; and
wherein said cavity includes a circumferential groove positioned between the magnet mounting surface and the internal diameter.

13. The electric motor of claim 10, wherein said body is fabricated from a sheet of metal having a uniform thickness.

14. The electric motor of claim 10, the second surface opposed to said first surface.

15. The electric motor of claim 14:
wherein the removal of material from the first surface of said body is removed from a sector of the first surface;
wherein the removal of material from the second surface of said body is removed from a sector of the second surface; and
wherein the sector of the first surface of said body and the sector the second surface of said body are in juxtaposition with each other.

16. The electric motor of claim 10, wherein said body defines a central hub defining a central bore therethrough.

17. The electric motor of claim 10, wherein the removal of material from the first surface of said body is removed from a sector of the first surface.

18. The electric motor of claim 10, wherein the second surface of said body is positioned radially outward from said magnet.

19. The rotor of claim 10, wherein said body comprises:
a rim extending axially from an outer periphery of said ridge, wherein said ridge is adapted to define a cavity at a junction of said outer portion and said rim for receiving at least a portion of said adhesive, and wherein said second surface comprises an axial end surface of said rim.

* * * * *